US006512870B1

(12) United States Patent
Ciciriello et al.

(10) Patent No.: US 6,512,870 B1
(45) Date of Patent: Jan. 28, 2003

(54) DEVICE FOR REMOVING TORSION IN OPTICAL FIBER RIBBONS

(75) Inventors: Saverio Ciciriello, Vaiano Cremasco (IT); Fabrizio Caroti, Rome (IT)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/889,954

(22) PCT Filed: Feb. 9, 2000

(86) PCT No.: PCT/US00/03363
§ 371 (c)(1), (2), (4) Date: Jan. 14, 2002

(87) PCT Pub. No.: WO00/48031
PCT Pub. Date: Aug. 17, 2000

(30) Foreign Application Priority Data

Feb. 9, 1999 (IT) .......................................... MI99A0245

(51) Int. Cl.[7] .................................................. G02B 6/44
(52) U.S. Cl. ......................... 385/114; 385/105; 385/106
(58) Field of Search ........................ 385/100–114, 135, 385/136, 134, 137

(56) References Cited

U.S. PATENT DOCUMENTS

| 5,517,591 A | * 5/1996 | Wagman et al. ............. 385/110 |
| 5,621,841 A | * 4/1997 | Field ........................... 385/113 |
| 5,659,655 A | 8/1997 | Pilatos ......................... 385/136 |
| 5,802,237 A | 9/1998 | Pulido .......................... 385/135 |

FOREIGN PATENT DOCUMENTS

| DE | 44 38 668 A1 | 5/1996 |
| DE | 44 39 853 A1 | 5/1996 |
| EP | 0 253 728 | 1/1988 |
| JP | 61050806 | 5/1987 |

OTHER PUBLICATIONS

K. Yoshioka, et al., "The Development of 300–fiber Lightweight Optical Fiber Cable and Related Technologies for Trunk Networks", Services & Systems, NTT Review, Jul. No. 4, 4(1992), Tokyo, JP, pp. 58–62.

* cited by examiner

Primary Examiner—Phan T. H. Palmer

(57) ABSTRACT

The invention relates to a device and a method for removing the residual torsion in the optical fiber ribbons of an optical fiber cable of the type used in the telecommunications industry. The cable (1) comprises a central core, a plurality of substantially helical grooves located in the central core, a plurality of optical fiber ribbons (11) located inside the grooves, and an outer protective sheathing. An intermediate portion of the cable, having a fixed length, comprises respective intermediate uncut portions of exposed ribbons which have been freed from the central core and the protective sheathing. The device comprises a spool (20) adapted to be wound up with at least some of the exposed ribbon. When the ribbons are wound onto the spool, the portions of the ribbons dowstream from the spool are free from residual torsion.

17 Claims, 4 Drawing Sheets

DEVICE FOR REMOVING TORSION IN OPTICAL FIBER RIBBONS

FIELD OF THE INVENTION

The present invention relates to devices and methods for removing the residual torsion in optical-fiber ribbons of an optical fiber cable of the type used in the telecommunications industry.

BACKGROUND OF THE INVENTION

Optical fiber cables of the type commonly used in the telecommunications industry comprise a high number of optical fibers organized in ribbons (usually made up of four fibers each), where each ribbon typically groups the fibers associated with two specific users. The optical fiber ribbons are properly housed inside grooves (usually five superimposed ribbons per groove) located on the peripheral portion of a central core of the cable, and are externally sheathed with one or more layers of insulating and protective material.

The grooves (usually five per cable) are angularly equidistant from one another, and they extend along the cable with a substantially helical progress. This configuration permits a relative displacement of the fibers with respect to each other, and with respect to central core of the cable, if the cable is subject to mechanical and/or thermal stresses. Such a configuration is advantageous in that the optical fibers are extremely delicate and are adversely affected by such stresses.

Optical fiber telecommunication networks are organized in a ring structure. The connection to the network is usually made after the line cable is laid. These connections are achieved through junctions which correspond with specific service areas provided along the ring line, and are usually sealed inside junction boxes.

For the purpose of allowing the connection of the various users to the communication network, the line cable must have, inside the junction boxes, some intermediate portions of fixed length (typically about five meters) in which the optical fiber cables are free from the external sheathing and the central core. This operation, commonly known as "cable peeling", must be carried out without interrupting the physical continuity of the fiber ribbons of the communication network, so as to allow the continuing transmission of the signal or signals along the entire ring line. Thus, in the portions of "peeled" cable located inside the junction boxes, the cable presents a plurality of intermediate portions of ribbon which extend uninterrupted from the grooves of the cable upstream from the junction box to the grooves of the cable downstream from the junction box. These portions are regularly collected in special housing units.

The intermediate portions of ribbon possess a residual torsion which arises from the helical progress of the grooves in which the ribbons upstream and downstream of the junction box are housed, and in which the same intermediate portions of ribbon were housed prior to the peeling of the cable. This residual torsion blocks the correct positioning on the housing units. Thus, it is necessary for the ribbons to have fixed-length portions which are free from residual torsion.

The prior art provides for the use of a comb-like tool provided with a plurality of longitudinal slots. Typically, the number of slots corresponds to the number of grooves on the optical-fiber cable. The comb is inserted between the ribbons inside the junction box, and is moved from one end of the junction box to the other. During the movement of the comb, the residual torsions are confined to the portions of ribbon downstream of the comb. Thus, the portions of ribbon downstream from the comb become increasingly piled up and twisted, even as the portions of ribbon upstream of the comb are freed from the residual torsion. At the end of the operation, there will be a skein of twisted ribbons downstream from the comb which is confined and enclosed in a space located at an end of the junction box. Due to the inherent fragility of the optical fibers within the ribbons (which, as noted above, do not endure mechanical stresses very well), the heaping of the ribbons in the skein can cause serious damage to the fibers, thereby adversely effecting the efficiency and quality of the signal transmission along the line.

There is thus a need in the art for a simple and effective method of removing the residual torsion in optical fiber ribbons which minimizes damage to the fibers and which therefore minimizes attenuation of the signal transmitted along the line. These and other needs are met by the present invention, as hereinafter described.

SUMMARY OF THE INVENTION

In one aspect, the present invention relates to a method and device for removing the residual torsion in the optical fiber ribbons of an optical fiber cable of the type commonly used in the telecommunications industry. Cables of this type typically comprise a central core, a plurality of substantially helical grooves located in the central core, a plurality of optical fiber ribbons located inside the grooves, and an external protective sheathing. The cable also typically comprises at least one intermediate section of fixed length, which includes portions of uncut ribbons that have been freed from the central core and from the external protective sheath, These portions of ribbon possess a residual torsion. In accordance with the present invention, a spool is provided which is adapted to be wound up with these portions of ribbons. In this way, the residual torsions of the optical-fiber ribbons are eliminated in an easy, practical and orderly manner without damaging the fibers or causing attenuation of the signal along the line.

During the installation of the network, the operator winds the ribbons onto the spool in a manner consistent with the helical pitch of the ribbons. The ribbons are neither cut nor interrupted. By use of the spool, the stress which the fibers are subjected to is minimized and is substantially lower than the stresses attendant to the prior art combing method. The use of the spool also eliminates any skein or entanglement of fibers inside the junction box, thus keeping the environment within the box cleaner and tidier and facilitating any inspection or maintenance operation thereon.

Preferably, the spool comprises a bottom plane, a guiding means for guiding the ribbon onto the spool, a ribbon housing means, and ribbon inlet and outlet openings to and from the guiding means and the ribbon housing means. Thus, the spool is extremely simple from the constructive point of view, and it can be readily produced from plastic materials by known molding processes.

The guiding and ribbon housing means preferably comprise first guiding walls which protrude perpendicularly from the bottom plane. The first guiding walls include a substantially circular central wall and have a fixed bending radius, and are also provided with a substantially annular peripheral wall which is concentric to the central wall. Thus, the ribbons are housed on a circular surface, and the housing is facilitated by the helical progress of the ribbons themselves. The bending radius of the central wall is preferably greater than some fixed minimum value. This protects the optical fibers within the ribbons from possible bending during installation and maintenance.

The ribbon inlet and outlet openings preferably comprise second guiding walls which protrude perpendicularly from the bottom plane. These walls include a substantially rectilinear base wall and upper walls that are substantially parallel to the base wall, and are radiused to the peripheral wall of the guiding means and the ribbon housing means. This design facilitates the introduction and extraction of the ribbons from the spool. Preferably, the spool is also devoid of any edges or acute angles which could damage the fibers.

The device of the present invention also preferably comprises holding means for holding the ribbons in position in the guiding means and the ribbon housing means. Such holding means advantageously comprises retaining tabs which protrude perpendicularly from the central wall and are substantially parallel to the bottom plane. The tabs are preferably interspaced from one another by about 90°. As a result, the positioning of the ribbons on the spool is extremely easy and safe. In the preferred embodiment, the positioning is further facilitated by the presence of notches on both the base and the peripheral wall which correspond with the tabs. The device of the present invention also preferably comprises means for clamping the spool to a support plane so as to ensure a safe positioning of the spool inside the junction box.

In another aspect, the present invention relates to a method for removing the residual torsion in optical fiber ribbons of an optical fiber cable of the type used in the telecommunications industry. The cable comprises a central core, a plurality of substantially helical grooves located in the central core, a plurality of optical fiber ribbons located inside the grooves, and an external protective sheathing. In accordance with the method, the central core and the protective sheathing is removed from a segment of the cable without cutting the ribbons, thereby freeing portions of the ribbons from the central core and from the protective sheathing. These portions of ribbon possess a residual torsion. Then, at least a portion of the ribbons are wound up onto a spool. Preferably, the spool-winding step comprises the step of winding the portions onto the spool so as to obtain the desired length of portions of ribbons which are free from residual torsion at a point downstream from the spool.

Further features and advantages of the present invention will appear more clearly from the following detailed description of the preferred embodiment, which description is made with reference to the attached drawings.

DETAILED DESCRIPTION OF THE INVENTION

Figure 1:
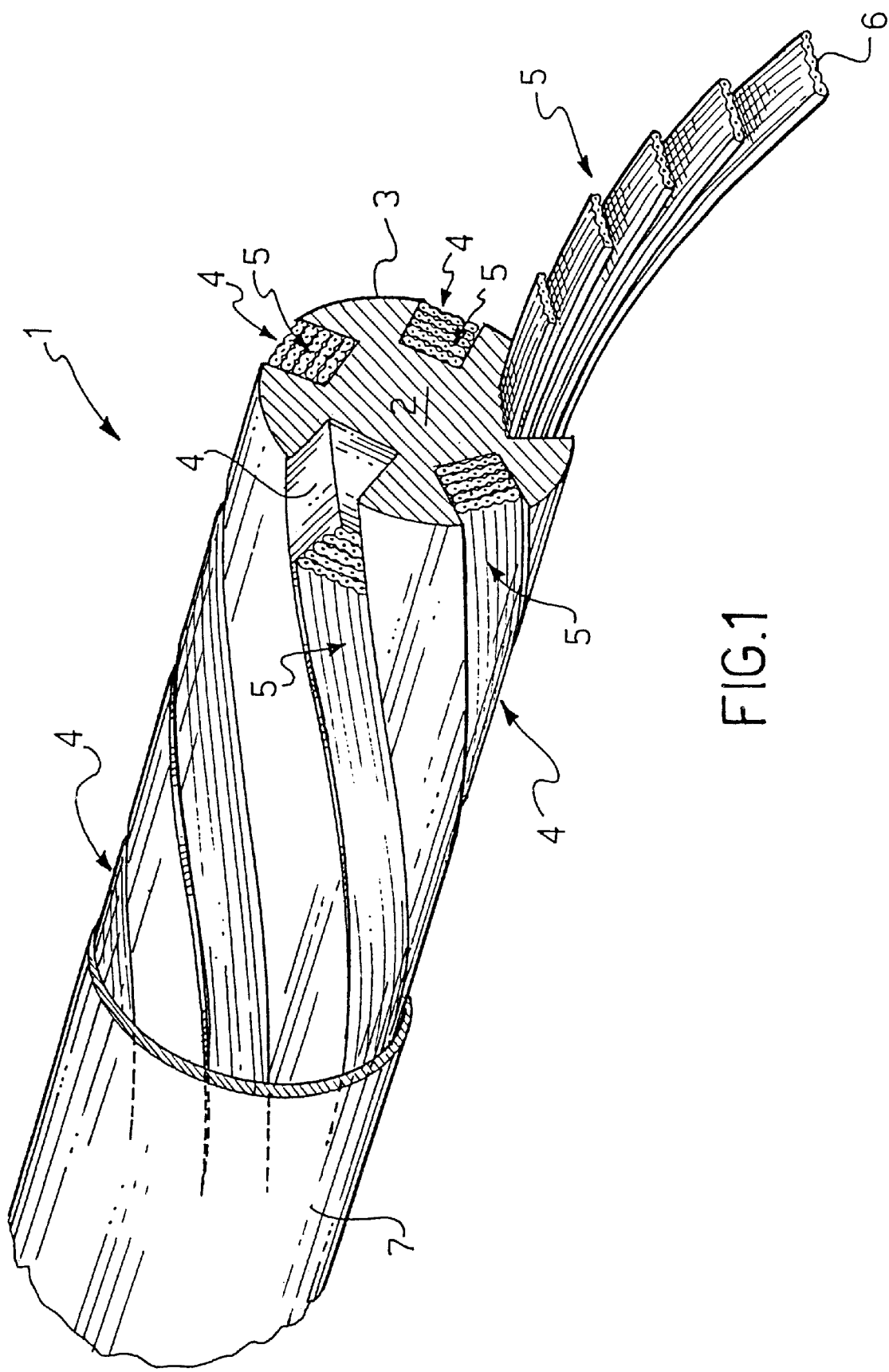
FIG. 1 shows a perspective view of a partly sectioned optical-fiber cable.

With reference to FIG. 1, an optical fiber cable 1 is shown of the type commonly used in the telecommunications industry for optical fiber communication networks. The cable comprises a central core 2, on the peripheral portion 3 of which there is a plurality (five in the specific example) of substantially helical grooves 4 (usually having a helical pitch of about half a meter) which are angularly equidistant from one another. The grooves loosely house a plurality (five in the specific example) of superimposed optical fiber ribbons 5. Each ribbon comprises four optical fibers 6 which are placed adjacent to each other and are properly insulated from one another. The cable further comprises an external protective sheathing 7 adapted to insulate the cable from the external environment.

Figure 2:
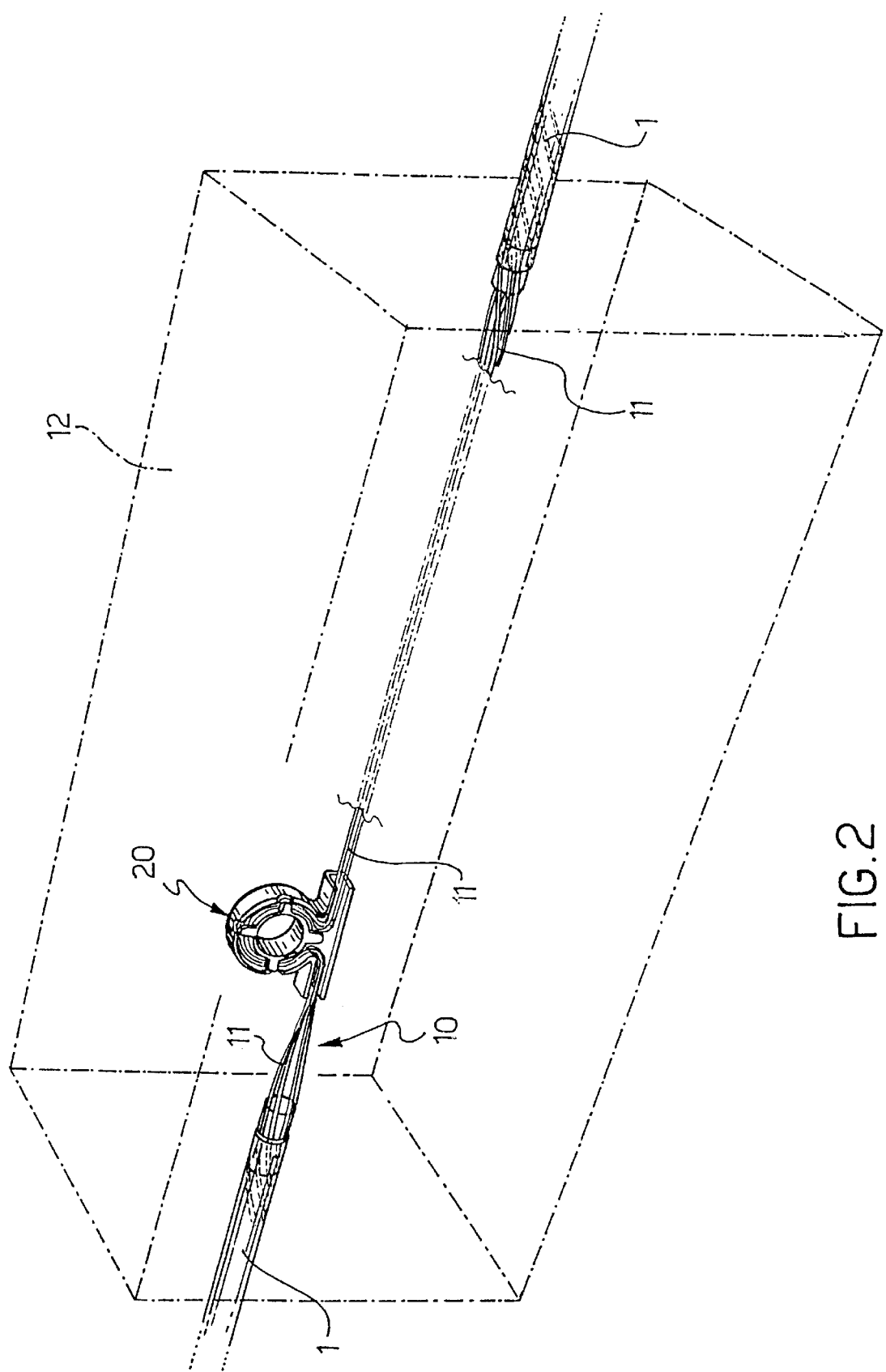
FIG. 2 shows a schematic view of the device of the invention in an operative configuration.

As shown schematically in FIG. 2, the cable comprises segments 10 of fixed length (typically of about five meters) of "peeled" cable, that is to say, lengths of cable in which the ribbons of optical fiber have been freed from the external sheathing and from the central core without being cut or without otherwise interrupting the physical continuity of the ribbons. The length of peeled cable includes portions 11 of exposed ribbon which are typically housed inside sealed junction boxes 12. Such boxes are placed along the line wherever there is a portion of peeled cable.

As seen in FIG. 2, the portions of exposed ribbon possess a residual torsion due to the helical orientation of the grooves in the optical fiber cable (see FIG. 1) in which the ribbons are housed upstream and downstream of the junction box 12, and in which the same exposed portions of ribbon were housed before the cable was peeled. This residual torsion is removed by a spool 20 which is adapted to be wounded up with a portion of the exposed ribbons. The spool can be made, for example, by molding a suitable plastic material, such as nylon, into the proper shape using well known molding techniques.

Figure 3:
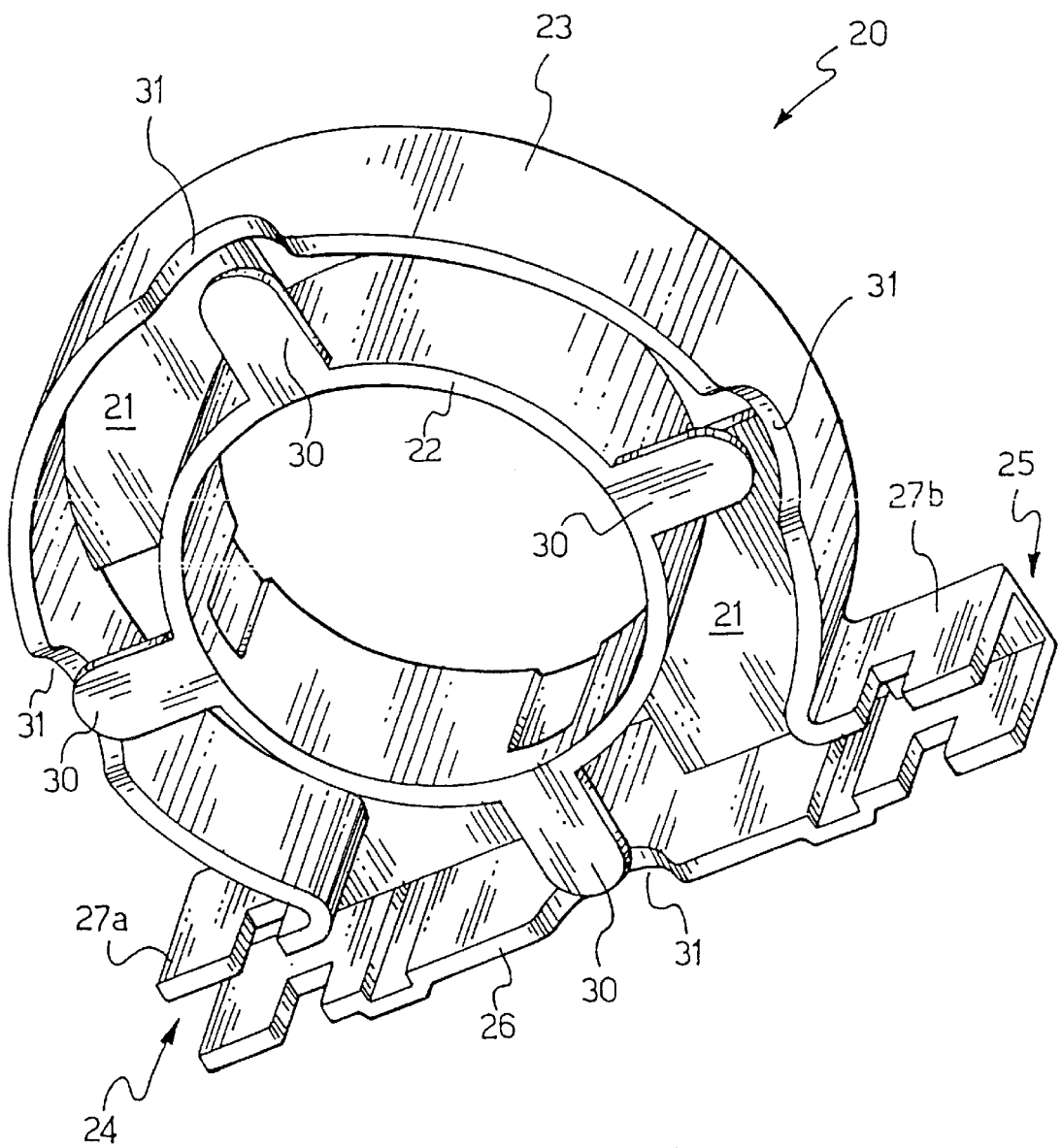
FIG. 3 shows an enlarged front perspective view of the device of FIG. 2.

With reference to FIG. 3, the spool comprises an annular bottom plane 21 which is bounded by a central guiding wall 22 and a peripheral guiding wall 23. The peripheral guiding wall is concentric to the central guiding wall and protrudes perpendicularly from the bottom plane. The walls 22 and 23 collectively define a guiding and housing seat for the portions of ribbons disposed in the spool. The central wall has a fixed bending radius (e.g., 30 mm) which is selected to protect the optical fibers within the ribbons against possible bending during installation and maintenance.

The spool also comprises ribbon inlet 24 and outlet 25 openings to and from the guiding means and the ribbon housing. The ribbon inlet and outlet openings comprise a substantially rectilinear base wall 26 which perpendicularly protrudes from the bottom plane 21, and upper walls 27a, 27b that are substantially parallel to the base wall and are connected to the peripheral wall 23.

Retaining tabs 30 protrude perpendicularly from the central wall 22 of the spool and are substantially parallel to the bottom plane 21. These tabs allow the ribbons to be retained in position inside the spool. The tabs are interspaced from one another by about 90°.

Figure 4:
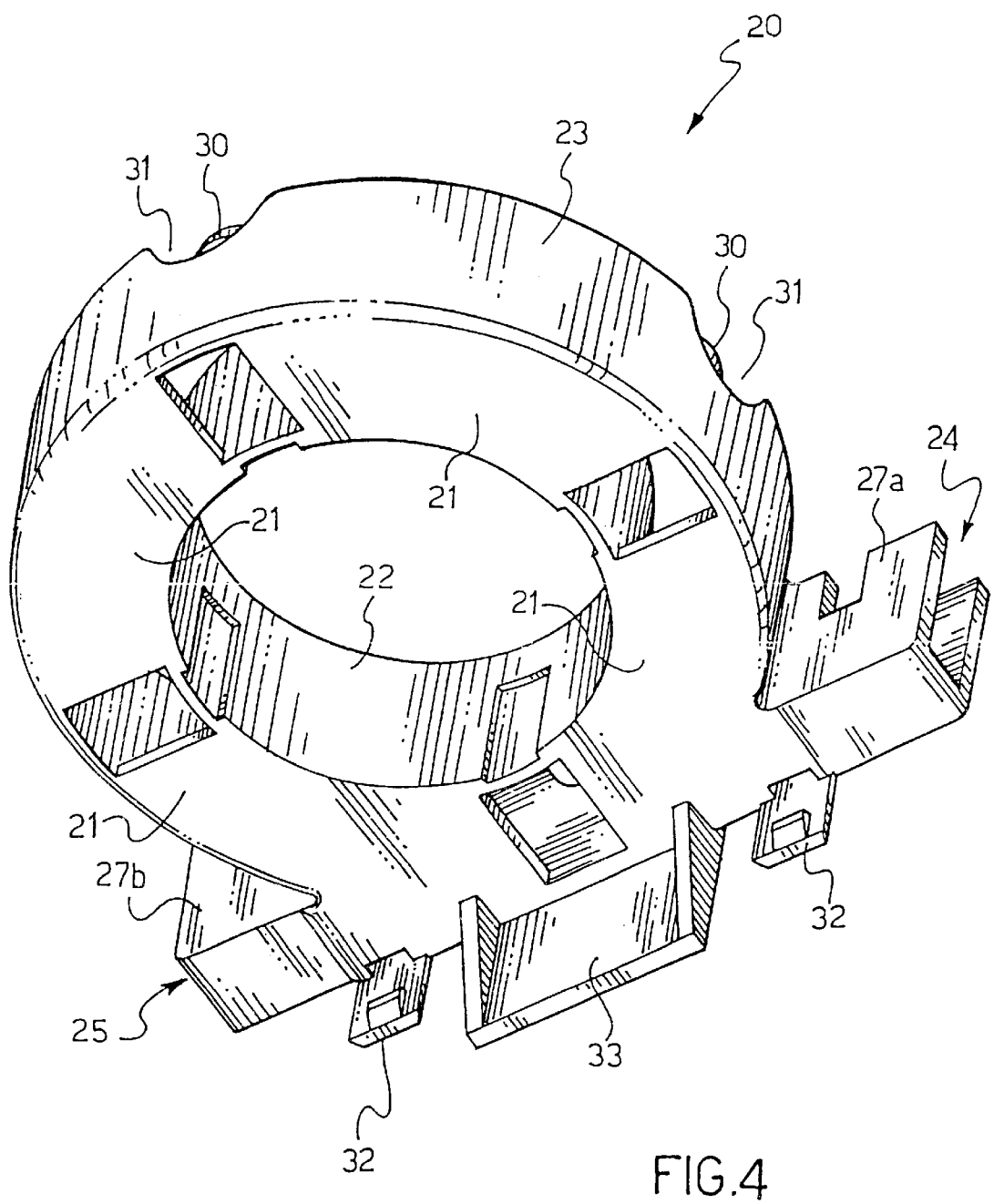
FIG. 4 shows an enlarged perspective view from rear of the device of FIG. 2.

On the peripheral wall 23 and on the base wall 26 there are, in correspondence with the tabs 30, respective notches 31 adapted to facilitate the fitting of the ribbons inside the spool. As seen in FIG. 4, the base wall 26 also comprises tongues 32 and 33 for the clamping and positioning of the spool to a support plane in the junction box.

While laying the cable, the operator can very easily and practically wind up a portion of the exposed ribbon on the spool in a manner consistent with their helical disposition. In this way, the portions of ribbon downstream from the spool are freed from the residual torsion and are ready for possible future connection. Any desired length of ribbon free from residual torsion can be obtained by further twisting of the spool. The portions of ribbon free from residual torsion are then housed in a conventional manner on special housing units.

What is claimed is:

1. An optical fiber cable assembly, comprising:
    an optical fiber cable comprising a plurality of optical fiber ribbons, wherein said ribbons are helically disposed about a core and are covered by a sheathing in a first and third portion of the cable but are devoid of the core and sheathing in a second portion of the cable disposed between said first and third portions; and
    a spool, in contact with said second portion, having at least a portion of said ribbons disposed about a surface thereof.

2. The optical fiber cable assembly of claim 1, wherein said spool comprises a bottom plane, a guiding means for guiding said ribbon onto the spool, a ribbon housing means, and ribbon inlet and outlet openings to and from the guiding means and the ribbon housing means.

3. The optical fiber cable assembly of claim 2, said assembly further comprising holding means for holding the ribbons in position within in the guiding means and the ribbon housing means.

4. The optical fiber cable assembly of claim 3, wherein said holding means comprises retaining tabs which protrude perpendicularly from said central wall and which are substantially parallel to said bottom plane.

5. The optical fiber cable assembly of claim 4, wherein said tabs are interspaced from one another by about 90°.

6. The optical fiber cable assembly of claim 3, wherein both said peripheral and the base walls comprise, in correspondence with said tabs, respective notches adapted to facilitate the housing of the ribbons inside the spool.

7. The optical fiber cable assembly of claim 2, wherein said guiding means and said ribbon housing means comprise first guiding walls protruding perpendicularly from said bottom plane, said first guiding walls including a substantially circular central wall having a fixed bending radius and a substantially annular peripheral wall which is concentric to the central wall.

8. The optical fiber cable assembly of claim 7, wherein the ribbon inlet and outlet openings comprise second guiding walls which protrude perpendicularly from the bottom plane, said second walls including a substantially rectilinear base wall and upper walls that are substantially parallel to the base wall and which are radiused to the peripheral wall of the guiding means and of the ribbon housing.

9. The optical fiber cable assembly of claim 1, wherein said core has a plurality of substantially helical grooves disposed thereon, and wherein said plurality of optical fiber ribbons are disposed inside said grooves.

10. The optical fiber cable assembly of claim 1, said cable further comprising clamping means for clamping said spool to a support plane.

11. A method for removing the residual torsion in exposed portions of the optical fiber ribbon of an optical fiber cable, comprising the steps of:
    providing a length of optical fiber cable comprising (a) a core, (b) a plurality of optical fiber ribbons disposed helically about the core, and (c) an external sheathing disposed over the core and the optical fiber ribbons;
    removing the core and the sheathing from an intermediate portion of the length of cable without cutting the ribbons, such that the ribbons possess a residual torsion; and
    winding up at least a portion of the ribbons onto a spool.

12. The method of claim 11, wherein the spool comprises a first surface having first and second concentric walls extending perpendicularly therefrom.

13. The method of claim 12, wherein the first surface is substantially planar.

14. The method of claim 12, wherein at least one of said first and second walls further comprises a plurality of tabs extending therefrom, and wherein said tabs are substantially parallel to said first surface.

15. The method of claim 14, further comprising a second surface which is substantially parallel to said first surface.

16. The method of claim 11, wherein the ribbons are twisted as they are wound up on the spool.

17. The method of claim 11, wherein the cable further comprises a plurality of grooves disposed helically on the surface of the core, and wherein the ribbons are disposed within the grooves.

* * * * *